United States Patent [19]

Lausberg et al.

[11] Patent Number: 5,179,164

[45] Date of Patent: Jan. 12, 1993

[54] THERMOPLASTIC POLYPROPYLENE/POLYAMIDE MOLDING COMPOSITION

[75] Inventors: Dietrich Lausberg; Erhard Seiler, both of Ludwigshafen; Christoph Plachetta, Limburgerhof; Hans-Georg Braun, Gruenstadt; Gerd Blinne, Bobenheim, all of Fed. Rep. of Germany

[73] Assignee: BASF Aktiengesellschaft, Ludwigshafen, Fed. Rep. of Germany

[21] Appl. No.: 668,701

[22] Filed: Mar. 8, 1991

Related U.S. Application Data

[63] Continuation of Ser. No. 310,908, Feb. 16, 1989, abandoned.

[30] Foreign Application Priority Data

Feb. 20, 1988 [DE] Fed. Rep. of Germany ....... 3805377

[51] Int. Cl.$^5$ .............................................. C08L 77/00
[52] U.S. Cl. .................................. 525/179; 525/181; 525/182
[58] Field of Search ......................................... 525/179

[56] References Cited

U.S. PATENT DOCUMENTS

| | | | |
|---|---|---|---|
| 3,373,223 | 3/1968 | Armstrong | 525/179 |
| 4,299,744 | 11/1981 | Stewart | 525/183 |
| 4,338,413 | 7/1982 | Coran et al. | 525/179 |
| 4,346,194 | 8/1982 | Roura | 525/66 |
| 4,416,942 | 11/1983 | DiLuccio | 525/179 |
| 4,780,505 | 10/1988 | Mashita et al. | 525/66 |

FOREIGN PATENT DOCUMENTS 0050471 4/1982 European Pat. Off. .
0180302 5/1986 European Pat. Off. .
0188123 7/1986 European Pat. Off. .
3507128 9/1986 Fed. Rep. of Germany .
59-136346 8/1984 Japan .

Primary Examiner—Ana L. Carrillo
Attorney, Agent, or Firm—Oblon, Spivak, McClelland, Maier & Neustadt

[57] ABSTRACT

Polypropylene/polyamide molding compositions, suitable in particular for producing moldings, advantageously consist of, in each case based on 100 parts by weight of the molding composition, A) from 10 to 89.5 parts by weight of one or more polypropylene homopolymers and/or copolymers,
B) from 10 to 89.5 parts by weight of one or more polyamides,
C) from 0.5 to 30 parts by weight of an ethylene copolymer as adhesion promoter,
D) from 0 to 30 parts by weight of an impact modifier and
E) from 0 to 60 parts by weight of a reinforcing agent and/or additive, the ethylene copolymer (C) advantageously being polymerized from, in each case based on (C), a) from 50 to 98% by weight of ethylene,
b) from 1 to 45% by weight of one or more alkyl (meth)acrylates having 1 to 8 carbon atoms in the alkyl, but not tert-butyl (meth)acrylate, and
c) from 1 to 40% by weight of one or more further monomers containing in bonded form a group which is reactive toward the polyamide, for example a carboxyl, carboxylic anhydride, tert-butyl carboxylate, sulfo, sulfonyl, oxazolinyl or epoxide group, and are produced by melting together components (A) to (C) and any (D) and/or (E) at from 200° to 300° C.

21 Claims, No Drawings

THERMOPLASTIC POLYPROPYLENE/POLYAMIDE MOLDING COMPOSITION

This application is a continuation of application Ser. No. 310,908, filed on Feb. 16, 1989, now abandoned.

The present invention relates to novel polypropylene/polyamide molding compositions which contain as an adhesion promoter an ethylene copolymer polymerized from
(a) ethylene,
(b) one or more alkyl(meth)acrylates but not tert-butyl (meth)acrylate and
(c) one or more further monomers having a group which is reactive toward the polyamide under the conditions of preparation.

Polypropylene homopolymers and copolymers, hereinafter also abbreviated to PP, have in general good mechanical properties, good processibility, and water resistance. However, the utility of polypropylenes is limited by the inadequate heat distortion resistance, the inadequate low-temperature toughness and the poor resistance to organic solvents.

This defect could be at least reduced or made good by the addition of polyamide (hereinafter also PA for short), which has the abovementioned properties to an outstanding degree. On the other hand, however, PA has an undesirably high moisture regain.

A particular disadvantage, however, is the incompatibility of PP with PA, so that simple mixtures do not have an industrially utilizable standard of properties.

Glass fiber reinforced PP/PA compositions are described in DE-A-3,507,128 (U.S. Pat. No. 4,613,647). To improve the adhesion between the apolar PP and the glass fibers, a PP which has been modified with an unsaturated carboxylic acid or an anhydride thereof is used. However, by raising the adhesion between the PP and the glass fibers the appearance of moldings produced therefrom is impaired.

To reduce the glass fiber content and to improve the appearance, PA, in particular nylon-6 or nylon-66, and glass fibers have been added to the PP. Compositions of this type, which consist of PP, modified PP, conventional PA, for example nylon-6 or nylon-66, and glass fibers, do not however show sufficient mechanical strength, and the hardness is appreciably reduced due to moisture absorption by the nylon grades used.

According to DE-A-3,507,128 (EP-A-200,184), this defect was removed by using a specific PA prepared by polycondensation of meta-xylylenediamine and adipic acid (nylon-MXD6). The disadvantage of this PP composition is that the key components are difficult to obtain and, what is more, the mechanical properties, in particular the low-temperature toughness, are unsatisfactory.

Similarly unsatisfactory is the toughness of the thermoplastic molding compositions described in EP-A-0,180,302, which are composed of from 10 to 90% by weight of a PP which has been modified with acid groups, with or without unmodified PP, and from 90 to 10% by weight of a PA, and which additionally contain, per 100 parts by weight of the mixture, from 2 to 30 parts by weight of an epoxy-containing copolymer.

EP-A-188,123 discloses films made of PP and PA which contain an adhesion promoter comprising ethylene/methyl acrylate, ethylene/acrylic acid, an ionomer, ethylene/vinyl acetate, anhydride-modified PP, polyethyloxazolines or stearylstearamide. Although nothing is specified about the properties of the films, it is asserted that the polyamide is incorporated in the film in the form of particles 8 pm or less in size. However, tests carried out by us have shown that in molding compositions none of the adhesion promoters mentioned gave a utilizable result.

It is an object of the present invention to provide thermoplastic PP/PA molding compositions of high toughness, stiffness and heat distortion resistance.

We have found, surprisingly, that this object is achieved by adding a specific ethylene copolymer as an adhesion promoter to PP/PA molding compositions.

The present invention accordingly provides a thermoplastic polypropylene/polyamide molding composition containing as an adhesion promoter an ethylene copolymer polymerized from
(a) ethylene,
(b) one or more alkyl (meth)acrylates of from 1 to 8 carbon atoms in a linear or branched alkyl, but not tert-butyl (meth)acrylate, and
(c) one or more further monomers containing a group which is reactive toward the polyamide, a process for producing the thermoplastic PP/PA molding composition, and a molding produced from the PP/PA molding composition as claimed in the appended claims.

We have also found specific refinements of the thermoplastic molding composition.

The thermoplastic PP/PA molding composition according to the invention consists advantageously of, in each case based on 100 parts by weight of the molding composition A) from 10 to 89.5 parts by weight, preferably from 20 to 85 parts by weight, of one or more polypropylene copolymers and/or preferably homopolymers, B) from 10 to 89.5 parts by weight, preferably from 25 to 75 parts by weight, of one or more polyamides, C) from 0.5 to 30 parts by weight, preferably from 2 to 25 parts by weight, of an ethylene copolymer as an adhesion promoter, this ethylene copolymer in turn being polymerized from, in each case based on (C),
  a) from 50 to 98% by weight, preferably from 60 to 95% by weight, of ethylene,
  b) from 1 to 45% by weight, preferably from 10 to 35% by weight, of one or more alkyl (meth)acrylates of from 1 to 8 carbon atoms in a linear or branched alkyl, preferably n-butyl (meth)acrylate and/or 2-ethylhexyl (meth)acrylate, except tert-butyl (meth)acrylate,
  c) from 1 to 40% by weight, preferably from 2 to 20% by weight, of one or more further monomers containing, attached by bonding, a group which, under the reaction conditions for producing the PP/PA molding composition, is reactive toward the polyamide (B), and advantageously selected from the group consisting of the olefinically unsaturated monocarboxylic acids and the corresponding tert-butyl esters, olefinically unsaturated dicarboxylic acids and the corresponding mono- or di-tertbutyl esters, olefinically unsaturated dicarboxylic anhydrides and sulfo-, sulfonyl-, oxazolinyl- or epoxy-containing olefinically unsaturated monomers, D) from 0 to 30 parts by weight, preferably from 0 to 25 parts by weight, of an impact modifier and E) from 0 to 60 parts by weight, preferably from 0 to 50 parts by weight, of a reinforcing agent and/or an additive.

There now follow specifics concerning the material side of the novel PP/PA molding compositions according to the invention and the preparation and use thereof:

A) Suitable polypropylenes are known from polymer chemistry, are described for example in Kunststoff-Handbuch, volume IV, Polyolefine, edited by R. Vieweg, A. Schley and A. Schwarz, Carl Hanser Verlag, Munich, 1969, and are commercially available, so that no details need be given.

Preference is given to using polypropylene homopolymers, in particular those which are prepared by polymerizing propylene in the presence of a Ziegler-Natta catalyst system and have a melt flow index (MFI) of from 0.1 to 10 g/10 min at 190° C. under a load of 2.16 kg, and a tensile modulus of elasticity of greater than 300 N/mm$^2$.

However, it is also possible to use copolymers prepared for example by random copolymerization or block copolymerization from propylene and ethylene, α-olefins, e.g. 1-butene, 1-pentene, 3-methyl-1-pentene, 1-hexene, 1-heptene or 1-octene, or dienes, e.g. norbornadiene or dicyclopentadiene.

B) Component (B) of the thermoplastic PP/PA molding compositions according to the invention comprises a polyamide or a mixture of a plurality of polyamides. In principle, it is possible to use any partially crystalline and amorphous PA, although partially crystalline PA is preferred, since the molding compositions produced therefrom are generally superior to those produced from amorphous PA in terms of heat distortion resistance and stress cracking resistance. PAs which are usable according to the invention are known per se and include for example PAs having molecular weights of 5000 or more, preferably from 5000 to 70,000, in particular from 10,000 to 65,000, as described for example in U.S. Pat. Nos. 2,071,250, 2,071,251, 2,130,523, 2,130,948, 2,241,322, 2,312,966, 2,512,906 and 3,393,210.

PAs may be prepared for example by condensing equimolar amounts of a saturated dicarboxylic acid of from 4 to 12 carbon atoms, preferably of from 6 to 12 carbon atoms, with a diamine of from 4 to 14 carbon atoms, by condensing Ω-aminocarboxylic acids, or by polyaddition of lactams. Examples of PAs are polyhexamethyleneadipamide (nylon 66), polyhexamethyleneazeleimide (nylon 69), polyhexamethylenesebacamide (nylon 610), polyhexamethylenedodecanediamide (nylon 612), the PAs obtained from lactams by ring opening, such as polycaprolactam or polylaurolactam, and also poly-11-aminoundecaneamide and di(p-aminocyclohexyl)methanedodecanediamide. It is also possible to use according to the invention PAs prepared by copolycondensation of 2 or more of the abovementioned polymers or their components, for example a copolymer of adipic acid, isophthalic acid and hexamethylenediamine. Preferably, the PAs are linear and have melting points of more than 200° C., preferably from 205° to 310° C.

Preferred PAs are polyhexamethyleneadipamide, polyhexamethylenesebacamide and polycaprolactam. The PAs in general have a relative viscosity of from 2.5 to 5, preferably from 2.8 to 4.5, as determined on a 1% strength by weight solution in H$_2$SO$_4$ at 23° C., which corresponds to a weight average molecular weight of from about 15,000 to 45,000. It is of course also possible to use mixtures of two or more PAs. The proportion of PA (B) in the PP/PA molding compositions according to the invention is advantageously, as already stated, from 10 to 89.5% by weight, based on the total weight. PP/PA molding compositions with a PA (B) content of from 25 to 75% by weight, in particular from 25 to 70% by weight, are particularly preferred.

C) An essential component of the novel PP/PA molding compositions is an adhesion promoter comprising an ethylene copolymer (C) in an effective amount, for example in an amount of from 0.5 to 30% by weight, preferably of from 2 to 25% by weight, based on the total weight of the PP/PA molding composition.

As stated above, the ethylene copolymers (C) advantageously have, based on the total weight, an ethylene content (a) of from 50 to 98% by weight, preferably of from 60 to 95% by weight, and an alkyl (meth)acrylate content (b) of from 1 to 45% by weight, preferably from 10 to 35% by weight, and contain a further monomer (c) having a polyamide-reactive group in an amount of from 1 to 40% by weight, preferably from 2 to 20% by weight.

a) The monomer ethylene is sufficiently well known in polymer chemistry, so that further observations are superfluous.

b) The acrylates and/or methacrylates (b) having from 1 to 8 carbon atoms, preferably from 2 to 8 carbon atoms, in the linear or branched alkyl are (meth)acrylic esters where the ester groups of the polymerized (meth)acrylate units in the resulting ethylene copolymer (C) only react to a minor degree, if at all, with the polyamide (B) under the reaction conditions for producing the PP/PA molding compositions. Examples are methyl, ethyl, n-propyl, i-propyl, n-butyl, i-butyl, n-pentyl, n-hexyl, 2-ethylhexyl, n-heptyl and n-octyl acrylates and methacrylates. The alkyl (meth)acrylates may be used singly or in the form of mixtures. Preference is given to using n-butyl acrylate and/or 2-ethylhexyl acrylate.

c) Suitable comonomers (c) are olefinically unsaturated monomers which are copolymerizable with ethylene and alkyl (meth)acrylates and contain in bonded form a reactive group which, in the resulting ethylene copolymer (C), reacts with the polyamide (B) under the reaction conditions for producing the PP/PA molding compositions, the chemical linking occurring to such an extent that the degree of coupling to the PA after the reaction has ended is greater than 0.03, preferably within the range from 0.05 to 1 and in particular from 0.08 to 0.8, the degree of coupling being defined as the ratio of ethylene copolymer (C) not extractable with toluene from the PP/PA molding composition relative to the total amount of ethylene copolymer (C) used.

Examples of groups which react with the PA (B) are sulfo, sulfonyl, oxazolinyl and epoxy groups and preferably carboxyl, tert-butyl carboxylate and carboxylic anhydride groups.

Suitable monomers (C) for preparing the ethylene copolymers (C) are for example olefinically unsaturated monocarboxylic acids, e.g. acrylic acid or methacrylic acid, and the corresponding tert-butyl esters, e.g. tert-butyl (meth)acrylate, olefinically unsaturated dicarboxylic acids, e.g. fumaric acid and maleic acid, and the corresponding mono- and/or di-tert-butyl esters, e.g. mono- or di-tert-butyl fumarate and mono- or di-tert-butyl maleate, olefinically unsaturated dicarboxylic anhydrides, e.g. maleic anhydride, sulfo- or sulfonyl-containing olefinically unsaturated monomers, e.g. p-styrenesulfonic acid, 2-(meth)acrylamido-2-methylpropenesulfonic acid or 2-sulfonyl-(meth)acrylate, oxazolinyl-containing olefinically unsaturated monomers, e.g. vinyloxazolines and vinyloxazoline derivatives, and epoxy-containing olefinically unsaturated monomers, e.g. glycidyl (meth)acrylate or allyl glycidyl ether.

Proven and hence preferred comonomers (c) are acrylic acid, methacrylic acid, tert-butyl (meth)acrylate and/or maleic anhydride.

The comonomers (c) mentioned, like the alkyl (meth)acrylates, may be used singly or mixed to prepare the ethylene copolymer (C).

The ethytene copolymers (C) which are usable according to the invention as adhesion promoters may be prepared in a conventional manner, for example by random copolymerization under high pressure, for example under from 200 to 4000 bar, and at elevated temperature, for example at within the range from about 120° to 300° C. Appropriate methods are described in trade and patent literature.

The melt flow indices of suitable ethylene copolymers (C) are advantageously within the range from 1 to 80 g/10 min, preferably from 2 to 25 g/10 min (measured at 190° C. under a load of 2.16 kg in accordance with German Standard Specification DIN 53, 735).

D) Besides the structural components (A) to (C), the PP/PA molding compositions according to the invention may, to improve the impact strength, contain impact modifiers, advantageously impact-modifying elastomers. Impact-modifying elastomers for PA/PP are known to a skilled worker. Examples are rubbers based on ethylene, propylene, butadiene or acrylate or mixtures thereof.

Suitable impact-modifying elastomers are described for example in Methoden der organischen Chemie (Houben-Weyl), volume XIV/1, Makromolekulare Chemie (Georg-Thieme-Verlag, Stuttgart, 1961), pages 390 to 406, and in the monograph by C. B. Bucknal, Toughened Plastics (Applied Science Publishers, London, 1977).

In what follows, some preferred types of these elastomers are described by way of example:

The preferred group comprises ethylene-propylene monomer (EPM) and ethylene-propylene-diene monomer (EPDM) rubbers, which advantageously have an ethylene radical:propylene radical ratio within the range from 20:80 to 80:20, preferably from 40:60 to 65:35.

The Mooney viscosities (MLI+4/100° C.) of such uncrosslinked EPM and EPDM rubbers whose gel contents are in general below 1% by weight are preferably within the range from 25 to 100, in particular from 35 to 90 (measured on the large rotor following a 4 minute run at 100° C. in accordance with German Standard Specification DIN 53 523).

EPM rubbers generally have virtually no remaining double bonds, while EPM rubbers may have from 1 to 20 double bonds/100 carbon atoms.

Examples of diene monomers for EPDM monomer rubbers are conjugated dienes such as isoprene and butadiene, nonconjugated diamines of from 5 to 25 carbon atoms, e.g. penta-1,4-diene, hexa-1,4-diene, 2,5-dimethylhexa-1,5-diene, hepta-1,4-diene and octa-1,4-diene, cyclic dienes such as cyclopentadiene, cyclohexadienes, cyclooctadienes and dicyclopentadiene, and also alkenylnorbornenes such as 5-ethylidene-2-norbornene, 5-butylidene-2-norborene, 2-methallyl-5-norbornene and 2-isopropenyl-5-norbornene, and tricyclodienes such as 3-methyltricyclo[5.2.1.0.2.6]-3,8-decadiene and mixtures thereof. Preference is given to using hexa-1,5-diene, ethylidene-norbornene and dicyclopentadiene. The diene content of EPDM rubbers is preferably from 0.5 to 10, in particular from 1 to 8,% by weight, based on the total weight of rubber.

Other preferred impact-modifying elastomers (D) are graft copolymers based on butadiene, butadiene-styrene or butadiene-acrylonitrile copolymers or acrylic esters as graft substrates, as described for example in DE-A-1,694,173 (U.S. Pat. No. 3,564,077) and DE-A-2,348,377 (U.S. Pat. No. 3,919,353).

Of these, it is in particular the ABS polymers described in DE-A-2,035,390, DE-A-2,248,242 and EP-A-22,216 which are of interest, those described in EP-A-22,216 being particularly preferred.

Elastomers (D) may also comprise graft polymers formed from 25-98% by weight of an acrylate rubber having a glass transition temperature of below −20° C., as the grafting base, and 20-75% by weight of a copolymerizable ethylenically unsaturated monomer whose homopolymers or copolymers have a glass transition temperature of more than 25° C., as the graft.

The grafting base comprises acrylate or methacrylate rubbers, although up to 40% by weight of further comonomers may be present. The $C_1$-$C_8$-esters of (meth)acrylic acid and halogenated derivatives thereof and also aromatic acrylic esters and mixtures thereof are preferred. Comonomers of the grafting base are acrylonitrile, methacrylonitrile, styrene, α-methylstyrene, acrylamides, methacrylamides and vinyl $C_1$-$C_6$-alkyl ethers.

The grafting base may be uncrosslinked or partially or completely crosslinked. The crosslinking is advantageously obtained by copolymerization with from 0.02 to 5% by weight, preferably with from 0.05 to 2% by weight, based on the weight of the grafting base, of a crosslinking monomer having more than one double bond. Suitable crosslinking monomers are described for example in DE-A-2,726,256 and EP-A-50,265.

Preferred crosslinking monomers are for example triallyl cyanurate, triallyl isocyanurate, triacryloyl-hexahydro-s-triazine and trialkylbenzenes.

If the crosslinking monomer has more than 2 polymerizable double bonds, it is advantageous to restrict its amount to not more than 1% by weight, based on the grafting base.

Particularly preferred grafting bases are emulsion polymers having a gel content of more than 60% by weight (determined in dimethylformamide at 25° C. in accordance with M. Hoffmann, H. Krömer, R. Kuhn, Polymeranalytik, Georg-Thieme-Verlag, Stuttgart, 1977).

Graft substrates which are also suitable are acrylate rubbers having a diene core as described for example in EP-A-50,262.

Suitable graft monomers are in particular styrene, α-methylstyrene, acrylonitrile, methacrylonitrile and methyl methacrylate and mixtures thereof, in particular those of styrene and acrylonitrile in a weight ratio of from 90:10 to 50:50. It is also possible to use up to 20% by weight of comonomers, for example the comonomers mentioned under (Cc).

The graft yield, i.e. the ratio of the amount of monomer incorporated in the graft and the amount of graft monomer, is in general within the range from 20 to 80%.

Rubbers based on acrylates which according to the invention may be used as elastomers (D) are described for example in DE-A-2,444,584 and DE-A-2,726,256.

The elastomers (D) preferably have a glass transition temperature of below $-30°$ C., in particular of below $-40°$ C., which gives good impact resistance even at low temperatures.

The elastomers and rubbers mentioned by way of example for use as impact modifiers (D) may be used not only singly but also in the form of mixtures.

E) Besides the structural components (A) to (C) and any (D), the PP/PA molding compositions according to the invention may also contain reinforcing agents and/or additives (E). The proportion of this component (E) is as already stated not more than 60% by weight, preferably not more than 50% by weight, based on the total weight of the PP/PA molding composition.

The reinforcing agents used may be reinforcing fillers, for example asbestos, carbon or preferably fibers, for example carbon fibers or in particular glass fibers, which may be finished with adhesion promoters and/or sizes. Suitable glass fibers which for example are also used in the form of glass fabrics, mats, wadding and/or preferably filament glass rovings or chopped glass filament made of low-alkaline E-glasses from 5 to 200 μm in diameter, preferably from 8 to 15 μm in diameter, generally have on incorporation into the PP/PA molding composition an average fiber length of from 0.05 to 1 mm, preferably of from 0.1 to 0.5 mm.

Examples of other suitable fillers, besides the aforementioned ones, are wollastonite, calcium carbonate, magnesium carbonate, amorphous silica, calcium silicate, calcium metasilicate, quartz powder, talc, kaolin, mica, feldspar, glass beads, silicon nitride, boron nitride and mixtures thereof.

Of proven utility are in particular glass fibers, especially where a high heat distortion resistance is demanded.

Examples of suitable additives are: stabilizers and oxidation retardants, thermal stabilizers, UV stabilizers, lubricants, demolding agents, colorants, such as dyes and pigments, nucleating agents and plasticizers.

Oxidation retardants and thermal stabilizers which may be added to the PP/PA molding compositions according to the invention are for example halides of metals of group I of the periodic table, for example sodium halides, potassium halides or lithium halides, with or without copper(I) halides, for example chlorides, bromides or iodides. It is also possible to use sterically hindered phenols, hydroquinones, substituted representatives of this group and mixtures thereof, preferably in concentrations of not more than 1% by weight, based on the weight of the molding composition.

Examples of UV stabilizers are various substituted resorcinols, salicylates, benzotriazoles and benzophenones, which in general are used in amounts of not more than 2% by weight based on the weight of the molding composition.

Lubricants and demolding agents, which in general are likewise added in amounts of not more than 1% by weight, based on the weight of the PP/PA molding composition, are stearic acids, stearyl alcohol, stearic esters and amides and also the fatty acid esters of pentaerythritol.

It is also possible to add organic dyes, such as nigrosine, pigments, e.g. titanium dioxide, cadmium sulfide, cadmium sulfide selenide, phthalocyanines, ultramarine blue or carbon black. Nucleating agents, such as talc, calcium fluoride, sodium phenylphosphinate, aluminum oxide or finely divided polytetrafluoroethylene, may be employed in amounts of for example up to 5% by weight, based on the structural components (A) to (E).

The PP/PA molding compositions according to the invention may be produced using any existing process where the structural components (A) to (C) and any (D) and/or (E) are turned into substantially homogeneous masses. For example, structural components PP(A), PA(B), ethylene copolymers (C) and any impact modifiers (D) and any reinforcing agents and/or additives (E) may be mixed directly, or a prepared mixture of (A) and (C) is introduced into the PA(B), or the ethylene copolymer (C) is incorporated into a PP/PA mass, and any impact modifiers (D) and reinforcing agents and/or additives (E) may be added separately or together with one of the structural components (A), (B) or (C) to a prepared mixture of (A) and (C), (B) and (C) or (A) and (B) or to the PP/PA molding composition of (A), (B) and (C) according to the invention. The mixing of structural components (A), (B) and (C) and any (D) and/or (E) or the prepared mixtures of one or more of the structural components (A) to (E) is advantageously carried out at from 0° to 150° C., preferably at from 10° to 100° C., in particular at from 10° to 35° C. The PP/PA molding compositions according to the invention are prepared at from 200° to 300° C., preferably at from 240° to 280° C., in the course of a residence time of from 40 to 300, preferably of from 40 to 180, seconds, with the structural components (A) to (C) for example in the free-flowing, softened or preferably molten state, for example by stirring, rolling, kneeding or extruding, for example using a twin-screw extruder or a kneader.

In the most convenient and therefore preferred method for producing the PP/PA molding compositions according to the invention, the structural components (A) and (C) are premixed in a separate processing stage, for example by incorporating (C) into a melt of (A) at from 200° to 260° C. in customary mixing apparatus such as mixers, kneeders and preferably extruders and then melting together this melt with the PA(B) and any (D) and/or (E) at from 240° to 280° C. in an extruder, preferably a twin-screw extruder, extruding the melt, cooling, and granulating. The two steps may also be carried out in succession in a single constructionally suitable apparatus, for example an extruder with a flanged-on side extruder. The granules obtained may be stored until used or be used directly for producing for example films or preferably moldings.

The PP/PA molding compositions according to the invention are homogeneous and shown no separation of the polymer compounds either in the melt or in the granule or molding. The PP/PA molding compositions are easy to use to produce moldings having good surface properties and improved impact resistance coupled with high stiffness, in particular at low temperatures, for example at −40° C. The PP/PA molding compositions are further suitable for producing films in a conventional manner.

EXAMPLES

Thermoplastic PP/PA molding compositions were produced according to the invention in Examples 1 to 16 and otherwise in Comparative Examples I to X using the following structural components:

Polypropylene (A)

PP-A1: Isotactic, partially crystalline PP having an MFI of 1.5 g/10 min, measured at 190° C. under a load of 21.6 kg in accordance with the German Standard Specification DIN 53 735.

The PP had a shear modules (+23° C.) of 410 N/mm$^2$ (Novolen ®1300 Z from BASF AG).

PP-A2: Polypropylene block copolymer including 6% by weight of polymerized ethylene units and having an MFI of 1.8 g/10 min, measured at 230° C. under a load of 2.16 kg in accordance with German Standard Specification DIN 53 735.

The polypropylene/polyethylene block copolymer had a shear modulus (+23° C.) of 600 N/mm$^2$ (Novolen 2300HX from BASF AG).

Polyamide (B)

PA-B1: Polycaprolactam having a relative viscosity of 3.5 (measured in a 0.5% strength by weight solution in 1:1 (by weight) phenol/o-dichlorobenzene at 25° C.)

PA-B2 Polyhexamethylenesebacamide having a relative viscosity of 3.23 (measured as described under PA-B1)

Ethylene copolymer (C) as adhesion promoter:

C1: Terpolymer of ethylene, n-butyl acrylate and acrylic acid in a weight ratio of 65:30:5, prepared by high pressure polymerization as described in EP-A-0,106,999.

The terpolymer had an MFI of 10 g/10 min, measured at 190° C. under a load of 2.16 kg in accordance with German Standard Specification DIN 53 735.

C2: The terpolymer of ethylene, n-butylacrylate and maleic anhydride in a weight ratio of 65:35:0.5 prepared as mentioned under C1.

The terpolymer had an MFI of 12 g/10 min, measured at 190° C. under a load of 2.16 kg.

C3: Terpolymer of ethylene, n-butyl acrylate and glycidyl methacrylate in a weight ratio of 67:30:3, prepared as mentioned under C1.

The terpolymer had an MFI of 9 g/10 min, measured at 190° C. under a load of 2.16 kg.

Component (D):

To improve the impact resistance, the following rubbers were used:

D1: Graft rubber with a graft substrate (75% by weight) of poly-n-butyl acrylate reacted with butanediol acrylate and a graft shell (25% by weight) of a copolymer of styrene, acrylonitrile and tert-butyl acrylate (weight ratio 73:24:3), prepared by emulsion polymerization in a conventional manner. (Average particle diameter $d_{50}$=420 nm.)

D2: Graft rubber with a graft substrate of polybutadiene (75%) and a graft shell (25%) of a copolymer of styrene, acrylonitrile and tert-butyl acrylate (weight ratio 73:24:3), prepared by emulsion polymerization in a conventional manner. (Average particle diameter $d_{50}$=250 nm.)

The average particle diameter $d_{50}$ is that diameter above and below which there are respectively 50% by weight of particles.

Reinforcing agents (E):

E: Glass fiber type R 20 EX 4 from European Owens Corning Fiberglass, 84651 Battice, Belgium Production of PP/PA molding compositions The structural components (A) and (C) were each melted together in and extruded from a twin-screw extruder at 240° C. in a preliminary step.

To product the PP/PA molding compositions, the extrudate from (A) and (C) and structural component (B) and any reinforcing agent (E) were mixed intensively at 25° C., introduced into a twin-screw extruder and melted at 250° C., homogenized and extruded into a water bath. Following granulation and drying, the molding composition was processed on an injection molding machine into test specimens, on which the mechanical properties were measured without further aftertreatment.

The hole impact strength was determined in accordance with German Standard Specification DIN 53,753, the impact strength in accordance with German Standard Specification DIN 53,453, the modulus of elasticity in accordance with German Standard Specification DIN 53,457 and the elongation at break in accordance with German Standard Specification DIN 53,455. The conditioning was carried out at 23° C. and 50% relative humidity over 30 days.

The nature and amount (% by weight, based on the total weight of the molding composition) of the structural components and the mechanical properties measured on the test specimens are summarized in Tables 1 and 3 below.

Table 1 shows the mechanical properties of the test specimen without glass fiber reinforcement and Table 2 with glass fiber reinforcement. The test specimens in Table 3 contain modifiers (D) to improve the impact strength.

Comparative Example V contains as the adhesion promoter a polypropylene copolymer modified with 1.8% by weight of acrylic acid, which has an MFI of 30 g/10 min, measured at 230° C. under a load of 2.16 kg in accordance with German Standard Specification DIN,53 735, and is abbreviated in Table 1 as PP/AA.

TABLE 1

Examples 1 to 7 and Comparative Examples I to V

| Comp. Ex. Ex. of invention | PP Amount [%] | Type | PA Amount [%] | Type | Adhesion promoter Amount [%] | Type | Mod. of elasticity N/mm$^2$ | Elongation at break % | hole impact strength nJ/m$^2$ |
|---|---|---|---|---|---|---|---|---|---|
| I | 50 | A1 | 50 | B1 | — | — | 1900 | 3 | 4 |
| II | 50 | A1 | 50 | B2 | — | — | 2000 | 4 | 3 |
| III | 30 | A1 | 70 | B2 | — | — | 2200 | 8 | 12 |
| IV | 50 | A2 | 50 | B1 | — | — | 1600 | 6 | 10 |
| V | 40 | A1 | 50 | B1 | 10 | PP-AS | 1900 | 4 | 7 |

TABLE 1-continued

Examples 1 to 7 and Comparative Examples 1 to V

| Comp. Ex. Ex. of invention | PP Amount [%] | Type | PA Amount [%] | Type | Adhesion promoter Amount [%] | Type | Mechanical Properties Mod. of elasticity N/mm² | Elongation at break % | hole impact strength nJ/m² |
|---|---|---|---|---|---|---|---|---|---|
| 1 | 40 | A1 | 50 | B1 | 10 | C1 | 1700 | 22 | 26 |
| 2 | 40 | A1 | 50 | B1 | 10 | C2 | 1600 | 35 | 32 |
| 3 | 40 | A1 | 50 | B1 | 10 | C3 | 1700 | 16 | 21 |
| 4 | 60 | A1 | 30 | B1 | 10 | C2 | 1100 | 120 | 50 |
| 5 | 40 | A1 | 50 | B2 | 10 | C2 | 2000 | 18 | 19 |
| 6 | 40 | A2 | 50 | B1 | 10 | C2 | 1300 | 30 | 41 |
| 7 | 65 | A2 | 30 | B1 | 5 | C2 | 1200 | 140 | 72 |

TABLE 2

Examples 8 to 12 and Comparative Examples VI to VII

| Comp. Ex. Ex. of invention | PP Amount [%] | Type | PA Amount [%] | Type | Adhesion promotor Amount [%] | Type | Reinforcing agent amount | Mechanical Properties Mod. of elasticity N/mm² | impact strength nJ/m² |
|---|---|---|---|---|---|---|---|---|---|
| VI | 35 | A1 | 35 | B1 | — | — | 30 E | 7400 | 11 |
| VII | 35 | A1 | 35 | B2 | — | — | 30 E | 7600 | 8 |
| VIII | 35 | A2 | 35 | B1 | — | — | 30 E | 6700 | 12 |
| 8 | 32 | A1 | 32 | B1 | 6 | C2 | 30 E | 6500 | 21 |
| 9 | 32 | A1 | 32 | B2 | 6 | C2 | 30 E | 6800 | 19 |
| 10 | 50 | A1 | 15 | B1 | 5 | C2 | 30 E | 6000 | 25 |
| 11 | 32 | A2 | 32 | B1 | 6 | C2 | 30 E | 6200 | 27 |
| 12 | 32 | A2 | 32 | B1 | 6 | C1 | 30 E | 6400 | 23 |

TABLE 3

Examples 1 to 16 and Comparatives Examples IX and X

| Comp. Ex. Ex. of invention | PP Amount [%] | Type | PA Amount [%] | Type | Adhesion promoter Amount [%] | Type | rubber Amount [%] | Type | Mechanical Properties Mod. of elasticity N/mm² | Elongation at break % | hole impact strength nJ/m² |
|---|---|---|---|---|---|---|---|---|---|---|---|
| IX | 50 | A1 | 40 | B1 | — | — | 10 | D1 | 1600 | 7 | 10 |
| X | 50 | A2 | 40 | B1 | — | — | 10 | D1 | 1300 | 12 | 15 |
| 13 | 40 | A1 | 40 | B1 | 10 | C1 | 10 | D1 | 1350 | 56 | 69 |
| 14 | 40 | A2 | 40 | B1 | 10 | C1 | 10 | D1 | 1000 | 86 | 83 |
| 15 | 40 | A1 | 40 | B1 | 10 | C1 | 10 | D2 | 1300 | 60 | 73 |
| 16 | 40 | A2 | 40 | B1 | 10 | C1 | 10 | D2 | 1000 | 92 | 86 |

We claim:

1. A homogeneous thermoplastic polypropylene/polyamide molding composition containing as an adhesion promoter an ethylene copolymer polymerized from
   (a) ethylene,
   (b) one or more alkyl (meth)acrylate of from 1 to 8 carbon atoms in a linear or branched alkyl, but excluding tert-butyl (meth)acrylate, and
   (c) one or more further monomers containing a group which is reactive toward the polyamide selected from the group consisting of the olefinically unsaturated monocarboxylic acids and the corresponding tert-butyl esters, olefinically unsaturated dicarboxylic acids and the corresponding tert-butyl esters, olefinically unsaturated dicarboxylic anhydrides, sulfo- or sulfonyl-containing olefinically unsaturated monomers and oxazolinyl-containing olefinically unsaturated monomers.

2. A homogeneous thermoplastic polypropylene/polyamide molding composition as claimed in claim 1, wherein the monomer (c) is selected from the group consisting of acrylic acid, methacrylic acid, maleic acid, fumaric acid, tert-butyl esters of the aforementioned monocarboxylic and dicarboxylic acids and maleic anhydride.

3. A homogeneous thermoplastic polypropylene/polyamide molding composition as claimed in claim 1, wherein the monomer (c) is maleic anhydride.

4. A molding produced from a thermoplastic polypropylene/polyamide molding composition as claimed in claim 1.

5. A homogeneous thermoplastic polypropylene/polyamide molding composition containing as an adhesion promoter an ethylene copolymer polymerized from
   a) from 50 to 98% by weight of ethylene,
   b) from 1 to 45% by weight of one or more alkyl (meth)acrylates of from 1 to 8 carbon atoms in a linear or branched alkyl, but excluding tert-butyl (meth)acrylate,
   c) from 1 to 40% by weight of one or more further monomers containing, attached by bonding, a group which is reactive toward the polyamide and selected from the group consisting of the olefinically unsaturated monocarboxylic acids and the corresponding tert-butyl esters, olefinically unsaturated dicarboxylic acids and the corresponding tert-butyl esters, olefinically unsaturated dicarboxylic anhydrides, sulfo-containing olefinically unsaturated monomers, sulfonyl-containing olefinically unsaturated monomers and oxazolinyl-containing olefinically unsaturated monomers, the weight percentages being based on the total weight of monomers (a), (b) and (c) and always adding up to 100% by weight.

6. A homogeneous thermoplastic polypropylene/polyamide molding composition containing as an adhesion component an ethylene copolymer polymerized from
 a) from 50 to 98% by weight of ethylene,
 b) from 1 to 45% by weight of n-butyl (meth)acrylate or 2-ethylhexyl (meth)acrylate and
 c) from 1 to 40% by weight of (meth)acrylic acid, maleic anhydride, tert-butyl (meth)acrylate or mixtures thereof, the weight percentages being based on the total weight of monomers (a), (b) and (c) and always adding up to 100% by weight.

7. A homogeneous thermoplastic polypropylene/polyamide molding composition consisting of, in each case based on 100 parts by weight of the molding composition,
 A) from 10 to 89.5 parts by weight of one or more polypropylene homopolymers or copolymers,
 B) from 10 to 89.5 parts by weight of one or more polyamides,
 C) from 0.5 to 30 parts by weight of an ethylene copolymer as an adhesion promoter polymerized from
  a) ethylene,
  b) one or more alkyl (meth)acrylates having from 1 to 8 carbon atoms in a linear or branched alkyl, but excluding tert-butyl (meth)acrylate, and
  c) one or more further monomers containing in bonded form a group which is reactive toward the polyamide and selected from the group consisting of olefinically unsaturated monocarboxylic acids and the corresponding tert-butyl esters, olefinically unsaturated dicarboxylic acids and the corresponding tert-butyl esters, olefinically unsaturated dicarboxylic anhydrides, sulfo- or sulfonyl-containing olefinically unsaturated monomers and oxazolinyl-containing olefinically unsaturated monomers,
 D) from 0 to 30 parts by weight of an elastomer impact modifier and
 E) from 0 to 60 parts by weight of a reinforcing agent, additive of mixtures thereof, said additive being selected from the group consisting of oxidation retardants, thermal stabilizers, UV stabilizers, lubricants, demolding agents, dyes, pigments, nucleating agents and plasticizers.

8. A process for producing a polypropylene/polyamide molding composition as claimed in claim 7 by melting together components (A) to (C) and any (D) or (E) in a customary mixing apparatus at from 200° to 300° C. in the course of a residence time of from 40 to 300 seconds.

9. A process for producing a homogeneous polypropylene/polyamide molding composition as claimed in claim 8 wherein the mixing apparatus is an extruder.

10. A homogeneous thermoplastic polypropylene/polyamide molding composition consisting of, in each case based on 100 parts by weight of the molding composition,
 A) from 10 to 89.5 parts by weight of one or more polypropylene homopolymers, copolymers or mixtures thereof,
 B) from 10 to 89.5 parts by weight of one or more polyamides,
 C) from 0.5 to 30 parts by weight of an ethylene copolymer as an adhesion promoter polymerized from, in each case based on (C),
  a) from 50 to 98% by weight of ethylene,
  b) from 1 to 45% by weight of one or more alkyl (meth)acrylates of from 1 to 8 carbon atoms in a linear or branched alkyl, but excluding tert-butyl (meth)acrylate, and
  c) from 1 to 40% by weight of one or more further monomers containing, attached by bonding, a group which is reactive toward the polyamide (B) and selected from the group consisting of the olefinically unsaturated monocarboxylic acids and the corresponding tert-butyl esters, olefinically unsaturated dicarboxylic acids and the corresponding tert-butyl esters, olefinically unsaturated dicarboxylic anhydride, sulfo-containing olefinically unsaturated monomers, sulfonyl-containing olefinically unsaturated monomers and oxazolinyl-containing olefinically unsaturated monomers,
 D) from 0 to 30 parts by weight of an elastomer impact modifier and
 E) from 0 to 60 parts by weight of a reinforcing agent or additive selected from the group consisting of oxidation retardants, thermal stabilizers, UV stabilizers, lubricants, demolding agents, dyes, pigments, nucleating agents and plasticizers.

11. A homogeneous thermoplastic polypropylene/polyamide molding composition consisting of, in each case based in 100 parts by weight of components (A) to (E),
 A) from 10 to 89.5 parts by weight of one or more polypropylene homopolymers or copolymers,
 B) from 10 to 89.5 parts by weight of one or more polyamides,
 C) from 0.5 to 30 parts by weight of an ethylene copolymer as an adhesion promoter polymerized from, in each case based on (C),
  a) from 50 to 98% by weight of ethylene,
  b) from 1 to 45% by weight of N-butyl(meth)acrylate or 2-ethylhexyl(meth)acrylate and
  c) from 1 to 40% by weight of (meth)acrylic acid, maleic anhydride, tert-butyl(meth)acrylate or mixtures thereof,
 D) from 0 to 30 parts by weight of an elastomer impact modifier and
 E) from 0 to 60 parts by weight of a reinforcing agent or additive selected from the group consisting of oxidation retardants, thermal stabilizers, UV stabilizers, lubricants, demolding agents, dyes, pigments, nucleating agents and plasticizers.

12. A homogeneous thermoplastic polypropylene/polyamide molding composition consisting essentially of
 a polypropylene selected from the group consisting of homopolymers of propylene, random- or block-copolymers of propylene and α- olefins or dienes, and mixtures thereof;
 a polyamide; and
 an ethylene polymer, as adhesion promoter, polymerized from
  (a) ethylene, (b) one or more alkyl (meth)acrylates of from 1 to 8 carbon atoms in a linear or branched alkyl, but excluding tert-butyl (meth)acrylates, and (c) one or more further monomers containing a group which is reactive toward the polyamide selected from the group consisting of the olefinically unsaturated monocarboxylic acids and the corresponding tert-butyl esters, olefinically unsaturated dicarboxylic acids and the corresponding tert-butyl esters, olefinically unsaturated dicarboxylic anhydrides, sulfo- or sulfonyl-containing olefinically unsaturated monomers and oxazolinyl-containing olefinically unsaturated monomers.

13. The homogeneous thermoplastic polypropylene/polyamide molding composition as claimed in claim 12, wherein the monomer (c) is selected from the group consisting of acrylic acid, methacrylic acid, maleic acid, fumaric acid, tert-butyl esters of the aforementioned monocarboxylic and dicarboxylic acids and maleic anhydride.

14. A homogeneous thermoplastic polypropylene/polyamide molding composition as claimed in claim 12, wherein the monomer (c) is maleic anhydride.

15. A homogeneous thermoplastic polypropylene/polyamide molding composition consisting essentially of a polypropylene selected from the group consisting of homopolymers of propylene, random- or block-copolymers of propylene and α-olefins or dienes, and mixtures thereof;

a polyamide; and an ethylene polymer, as adhesion promoter, polymerized from
  a) from 50 to 98% by weight of ethylene,
  b) form 1 to 45% by weight of one or more alkyl (meth)acrylates of from 1 to 8 carbon atoms in a linear or branched alkyl, but excluding tert-butyl (meth)acrylate,
  c) from 1 to 40% by weight of one or more further monomers containing, attached by bonding, a group which is reactive toward the polyamide and selected from the group consisting of olefinically unsaturated monocarboxylic acids and the corresponding tert-butyl esters, olefinically unsaturated dicarboxylic acids and the corresponding tert-butyl esters olefinically unsaturated dicarboxylic anhydrides, sulfo-containing olefinically unsaturated monomers, sulfonyl-containing olefinically unsaturated monomers, and oxazolinyl-containing olefinically unsaturated monomers, the weight percentages being based on the total weight of monomers (a), (b) and (c) and always adding up to 100% by weight.

16. A homogeneous thermoplastic polypropylene/polyamide molding composition consisting essentially of a polypropylene selected from the group consisting of homopolymers of propylene, random- or block-copolymers of propylene and α- olefins or dienes, and mixtures thereof;

a polyamide; and an ethylene polymer, as adhesion promoter, polymerized from
  a) from 50 to 98% by weight of ethylene,
  b) from 1 to 45% by weight of n-butyl (meth)acrylate of 2-ethylhexyl (meth)acrylate and
  c) from 1 to 40% by weight of (meth)acrylic acid, maleic anhydride, tert-butyl (meth)acrylate or mixtures thereof, the weight percentages being based on the total weight of monomers (a), (b) and (c) and always adding up to 100% by weight.

17. A homogeneous thermoplastic polypropylene/polyamide molding composition consisting essentially of, in each case based on 100 parts by weight of the molding composition, A) from 10 to 89.5 parts by weight of one or more polypropylenes selected from the group consisting of homopolymers of propylene, random- or block-copolymers of propylene and α-olefins or dienes, and mixtures thereof;

B) from 10 to 89.5 parts by weight of one or more polyamides;

C) from 0.5 to 30 parts by weight of an ethylene copolymer as an adhesion promoter polymerized from
  a) ethylene,
  b) one or more alkyl (meth)acrylates having from 1 to 8 carbon atoms in a linear or branched alkyl, but excluding tert-butyl (meth)acrylates, and
  c) one or more further monomers containing in bonded form a group which is reactive toward the polyamide selected from the group consisting of the olefinically unsaturated monocarboxylic acids and the corresponding tert-butyl esters, olefinically unsaturated dicarboxylic acids and the corresponding tert-butyl esters, olefinically unsaturated dicarboxylic anhydrides, sulfo- or sulfonyl-containing olefinically unsaturated monomers and oxazolinyl-containing olefinically unsaturated monomers and oxazolinyl-containing olefinically unsaturated monomers D) from 0 to 30 parts by weight of an elastomer impact modifier and E) from 0 to 60 parts by weight of a reinforcing agent, additive or mixtures thereof, said additives being selected from the group consisting of oxidation retardants, thermal stabilizers, UV stabilizers, lubricants, demolding agents, dyes, pigments, nucleating agents and plasticizers.

18. A process for producing a polypropylene/polyamide molding composition as claimed in claim 17 by melting together components (A) to (C) and any (D) or (E) in a customary mixing apparatus at from 200° to 300° C. in the course of a residence time of from 40 to 300 seconds.

19. A process for producing a homogeneous polypropylene/polyamide molding composition as claimed in claim 18, wherein the mixing apparatus is an extruder.

20. A homogeneous thermoplastic polypropylene/polyamide molding composition consisting of, in each case base on 100 parts by weight of the molding composition, A) from 10 to 89.5 parts by weight of one or more polypropylenes selected from the group consisting of homopolymers of propylene, random- or block-copolymers of propylene and α-olefins or dienes, and mixtures thereof;

B) from 10 to 89.5 parts by weight of one or more polyamides,

C) from 0.5 to 30 parts by weight of an ethylene copolymer as an adhesion promoter polymerized from, in each case based on (C),
  a) from 50 to 98% by weight of ethylene, b) from 1 to 45% by weight of one or more alkyl (meth)acrylates of from 1 to 8 carbon atoms in a linear or branched alkyl, but excluding tert-butyl (meth)acrylic, and c) from 1 to 40% by weight of one or more further monomers containing, attached by bonding, a group which is reactive toward the polyamide (B) and selected from the group consisting of the olefinically unsaturated monocarboxylic acids and the corresponding tert-butyl esters, olefinically unsaturated dicarboxylic acids and the corresponding tert-butyl esters, olefinically unsaturated dicarboxylic anhydrides, sulfo-containing olefinically unsaturated monomers, sulfonyl-containing olefinically unsaturated monomers, and oxazolinyl-containing olefinically unsaturated monomers;

D) from 0 to 30 parts by weight of an elastomer impact modifier and

E) from 0 to 60 parts by weight of a reinforcing agent or additive selected from the group consisting of oxidation retardants, thermal stabilizers, UV stabilizers, lubricants, demolding agents, dyes, pigments, nucleating agents and plasticizers.

21. A homogeneous thermoplastic polypropylene/polyamide molding composition consisting of, in each case based on 100 parts by weight of components (A) to (E), A) from 10 to 89.5 parts by weight of one or more polypropylenes selected from the group consisting of homopolymers of propylene, random- or block-copolymers or propylene and α-olefins or dienes, and mixtures thereof;

B) from 10 to 89.5 parts by weight of one or more polyamides;

C) from 0.5 to 30 parts by weight of an ethylene copolymer as an adhesion promoter polymerized from, in each case based on (C),
  (a) from 50 to 98% by weight of ethylene,
  (b) from 1 to 45% by weight of n-butyl (meth)acrylate or 2-ethylhexyl (meth)acrylate and
  (c) from 1 to 40% by weight of (meth)acrylic acid, maleic anhydride, tert-butyl (meth)acrylate or mixtures thereof;

D) from 0 to 30 parts by weight of an elastomer impact modifier and

E) from 0 to 60 parts by weight of a reinforcing agent or additive selected from the group consisting of oxidation retardants, thermal stabilizers, UV stabilizers, lubricants, demolding agents, dyes, pigments, nucleating agents and plasticizers.

* * * * *